Patented Nov. 6, 1928.

1,690,708

UNITED STATES PATENT OFFICE.

JOHN D. WIGGIN, OF MONTCLAIR, AND MATHIAS M. REMMES, OF BELLEVILLE, NEW JERSEY, ASSIGNORS TO H. B. WIGGIN'S SONS COMPANY, OF BLOOMFIELD, NEW JERSEY, A CORPORATION OF NEW JERSEY.

COMPOSITION OF MATTER AND MOLD MADE THEREFROM AND METHOD OF CASTING POTTERY IN THE MOLD.

No Drawing.    Application filed October 29, 1924.   Serial No. 746,666.

This invention relates to a composition of matter which may be used advantageously in the making of molds, such as those employed in the making of ceramic ware.

Ceramic ware is made in many ways only two of which will be mentioned and the application of the invention to them pointed out for purposes of illustration.

One method is known as casting. In this a clay "slip" is first made by mixing finely divided clay and other materials with the proper amount of water so that the mixture is of a consistency like cream. The slip is poured into a mold usually made of plaster of Paris which absorbs the water from the slip and leaves the clay on the mold face. The clay cast when dry enough is removed from the mold and fired.

Another method is known as jigging. In this method the clay and water are so proportioned that although the mixture is plastic it will retain its shape. A lump of the mixture is placed on a spinning mold, usually of plaster, so that it will absorb the water from the mixture, and another mold pressed toward the first mold pressing and spinning the clay between the two molds until the desired cast is produced.

The clay mixture in the processes outlined above usually contains a carbonate, almost invariably a soluble alkali carbonate as sodium carbonate, which is added to the mixture to keep it homogeneous. The presence of this carbonate is a source of great trouble in the molding, however, due to the fact that it reacts with the calcium sulphate of the plaster of Paris eating away the face of the mold thereby causing it to become uneven and also causing disintegration of the entire mold.

It is an object of this invention to disclose a composition of matter which may be used for making a mold which will not readily disintegrate under the action of the slip prepared for pottery making.

Another object of the invention is to disclose a composition of matter containing a substance which will largely prevent a reaction between the carbonate of the slip used for pottery making and the calcium sulphate of a plaster of Paris mold used to cast the pottery.

Still another object of the invention is to disclose a mold which is so made that it will not readily disintegrate under the action of the slip prepared for pottery making.

A further object of the invention is to disclose a method of rendering a plaster of Paris mold resistant to disintegration under the action of the slip prepared for pottery making.

A still further object of the invention is to disclose a method of casting pottery, so that the mold used will not readily disintegrate under the action of the slip.

Other objects and features of the invention will more fully appear from the following description and will particularly be pointed out in the claims.

As stated above, one of the great trouble with the molding method of making pottery is due to the fact that the slip causes a disintegration of the mold used caused in large measure, if not entirely, by the action of the carbonate of the slip on the calcium sulphate of the plaster of Paris mold with the formation and precipitation of calcium carbonate.

It has been discovered that certain substances may be added to the plaster of Paris used for making the mold, which will substantially prevent the reaction between the carbonate of the slip and the calcium sulphate of the mold and thus largely prevent the disintegration of the mold.

A general property of all these substances is that they are more soluble than is calcium sulphate. The substances may be divided into two classes, the first class including those which react directly with the carbonate of the slip and thus prevent the sodium carbonate from reacting with the calcium sulphate of the plaster, and the second class including those which react with other substances present to produce reaction products which react with the carbonate of the slip. The substances of the first class react with the carbonate of the slip usually with the formation of a carbonate which is more insoluble than calcium sulphate and precipitates, thus leaving the mold free from pit holes and preventing its disintegration.

The substances of the second class usually react with the calcium sulphate of the mold in the presence of water to produce precipitates much more insoluble than calcium sulphate, and also produce reaction products which react with the carbonate of the slip either with the formation of carbonates which are more insoluble than calcium sulphate and precipitate or with the formation of carbonic acid which decomposes into water and carbon dioxide. It appears that when the substance added to the plaster of Paris reacts with the calcium sulphate to form the insoluble precipitate, the precipitate is formed within the mold. The reaction products formed are therefore formed within the mold and if insoluble remain there while if soluble dissolve in the water of the slip.

In whatever manner the substances added to the plaster of Paris react, their characteristics are that they substantially prevent the reaction of the carbonate in the slip with the calcium sulphate of the mold by forming an insoluble precipitate or the easily decomposed carbonic acid, and the result is that the surface of the mold is not destroyed and the mold is not disintegrated.

Among the substances of the first class which react directly with the carbonate of the slip may be mentioned calcium chloride and magnesium sulphate.

The calcium chloride is very soluble and reacts with the carbonate to form calcium carbonate and a chloride. The calcium carbonate precipitates and the reaction continues until the carbonate is exhausted, sufficient calcium chloride being in the plaster of Paris to react with the carbonate in a large number of pourings of the slip. The chloride formed does not react with the calcium sulphate of the plaster of Paris and does not cause disintegration of the mold.

In the case of magnesium sulphate, magnesium carbonate is formed and precipitates, due to the reaction of the sulphate with the carbonate in the slip. A soluble sulphate remains in the mold.

Among the substances of the second class which react with the calcium sulphate of the mold to produce precipitates and reaction products which react with the carbonate of the slip, may be mentioned barium chloride and oxalic acid.

The barium chloride is a very desirable material for use in this connection, because it is readily procurable and a mold made from plaster of Paris having mixed therewith, 1% of barium chloride is very resistant to the action of a highly reactive carbonate, such as sodium carbonate. In the presence of water the barium chloride reacts with the calcium sulphate to produce barium sulphate, which is extremely insoluble. The reaction between the barium chloride and the calcium sulphate to form the insoluble barium sulphate probably takes place to a large extent when the plaster compound is mixed with water in making the mold. It is believed that when the barium sulphate is formed at this time it precipitates on and encloses substantially all of the calcium sulphate crystals which do not react with the barium chloride, thus enclosing each of the calcium sulphate crystals with an insoluble coating which protects the calcium sulphate from attack by the carbonate of the slip when the mold is later used for molding the clay. The calcium chloride formed as a reaction product of the formation of barium sulphate remains in the mold and reacts with the carbonate of the slip during the casting thus removing the carbonate which might attack any calcium sulphate crystals not enclosed in barium sulphate. If any of the calcium sulphate is not wholly coated and protected by the barium sulphate during the making of the mold, it is believed that when the water of the slip enters the mold a further reaction between the barium chloride and the uncoated calcium sulphate takes place, the barium chloride reacting with the calcium sulphate at the unprotected spots and depositing the protecting coating of barium sulphate on the calcium sulphate. The barium sulphate is not appreciably attacked by any of the elements of the slip and therefore last through the formation of many casts. The result of these chemical changes and crystallizations is a mold having a high resistance to the disintegrating effect of the slip.

Oxalic acid reacts in substantially the same way as does barium chloride in that it reacts with the calcium sulphate to produce the very insoluble calcium oxalate and sulfuric acid which acid in turn reacts with the sodium carbonate to produce sodium sulphate and the easily decomposable carbonic acid. The carbonic acid formed quickly decomposes into water and a carbon dioxide gas which passes off with the result that very little calcium carbonate is precipitated.

The substances may be added to the plaster of Paris in any suitable manner. It has been found convenient either to add the dry substance in the proper proportion to the dry plaster of Paris or to add the substance to the water with which the plaster of Paris is mixed to form the mold. From a manufacturing point of view, it is deemed preferable to mix the dry substance with the dry plaster of Paris because the mixing can then be done at the plant which prepares the plaster compound and the compound is sold as an article of commerce, the only preparation needed to form the mold being the addition of water as is usual. It is recognized, however, that the substance may be added to the plaster of Paris after the mold is formed by soaking the mold made from plaster of Paris having none of the substances in it, in water which contains the substance.

In the course of experiments carried on during the testing of this invention, molds have been made containing barium chloride in proportion of 1% of the weight of the plaster of Paris used. It has been found that a mold containing barium chloride in this proportion may be used to cast over fifty clay forms without disintegration, the face of the mold at the end of fifty casts being as smooth as it was before the first cast was made. If no barium chloride or other substance is used, the face of the mold is pitted and the disintegration of the mold is noticeable after eight casts have been made.

Although particular substances have been mentioned in this specification, it is to be understood that they are only illustrative of many substances which may be used and furthermore applicants do not wish to be bound by the statements they have made concerning the reactions taking place or the way in which the crystallization takes place as it may later be shown that other or different reactions and crystallizations occur. As far as is known at present, however, the statements are correct.

Throughout the specification and claims the term "slip" is to be understood to include all mixtures of clay, water and other materials from which the ceramic ware is formed irrespective of whether the mixtures are in a fluid or solid state and the term "pottery" is to be understood to include all ceramic ware.

We claim:

1. A composition of matter comprising plaster of Paris and barium chloride.

2. A composition of matter comprising plaster of Paris and a substance, which in the presence of water and calcium sulphate and a carbonate, will prevent a reaction between the calcium sulphate and the carbonate.

3. A composition of matter comprising plaster of Paris and a substance, which in the presence of water and calcium sulphate and a soluble carbonate will prevent a reaction between the calcium sulphate and the carbonate and will form a precipitate.

4. A composition of matter comprising plaster of Paris and a substance, which in the presence of water and calcium sulphate and a soluble carbonate, will prevent a reaction between the calcium sulphate and the carbonate and will react with the calcium sulphate to form a precipitate.

5. A composition of matter comprising plaster of Paris and a substance more soluble in water than calcium sulphate and which in the presence of water and calcium sulphate and a carbonate will prevent a reaction between the calcium sulphate and the carbonate.

6. A composition of matter comprising plaster of Paris and a substance more soluble in water than calcium sulphate and which in the presence of water and calcium sulphate and a soluble carbonate will prevent a reaction between the calcium sulphate and the carbonate and will form a precipitate.

7. A composition of matter comprising plaster of Paris and a substance more soluble in water than calcium sulphate and which in the presence of water and calcium sulphate and a soluble carbonate will prevent a reaction between the calcium sulphate and the carbonate and will react with the calcium sulphate to form a precipitate.

8. A composition of matter comprising plaster of Paris and a substance which in the presence of water having a carbonate in solution will form a practically insoluble precipitate.

9. A composition of matter comprising plaster of Paris and a substance which in a water solution containing calcium sulphate and a soluble carbonate will prevent a reaction between the calcium sulphate and the carbonate and eliminate the soluble carbonate as such from the solution.

10. A composition of matter comprising plaster of Paris and a substance which in a water solution containing calcium sulphate and a soluble carbonate will prevent a reaction between the calcium sulphate and the carbonate and eliminate the soluble carbonate as such from the solution while forming a precipitate.

11. A mold made from a material comprising plaster of Paris and barium chloride.

12. A mold made from a material comprising plaster of Paris and a soluble substance which in the presence of water having a carbonate in solution will form a practically insoluble precipitate.

13. A mold made from a material comprising plaster of Paris and a substance which in the presence of water and calcium sulphate and a carbonate will prevent a reaction between the calcium sulphate and the carbonate.

14. A mold made from a material comprising plaster of Paris and a substance which in the presence of water and calcium sulphate and a soluble carbonate will prevent reaction between the calcium sulphate and the carbonate and will form a precipitate.

15. A mold made from a material comprising plaster of Paris and a substance more soluble in water than calcium sulphate which in the presence of water and calcium sulphate and a soluble carbonate will prevent a reaction between the calcium sulphate and the carbonate.

16. A mold made from a material comprising plaster of Paris and a substance more soluble in water than calcium sulphate and which in a water solution containing calcium sulphate and a soluble carbonate will prevent a reaction between the calcium sulphate and the carbonate and eliminate the soluble carbonate as such from the solution while forming a precipitate.

17. A method of rendering plaster of Paris resistant to disintegration by water containing a soluble carbonate, which comprises adding to the plaster of Paris a substance which in the presence of water and calcium sulphate and the carbonate will prevent the reaction of calcium sulphate with the carbonate.

18. The method of rendering plaster of Paris resistant to disintegration by a water solution containing a soluble carbonate, which comprises adding to the plaster of Paris a substance which in the presence of the said solution and calcium sulphate will prevent the reaction of calcium sulphate and the carbonate while eliminating the soluble carbonate as such from the solution.

19. The method of rendering plaster of Paris resistant to disintegration by a water solution containing a soluble carbonate, which comprises adding to the plaster of Paris a substance more soluble in water than calcium sulphate and which in the presence of said solution and calcium sulphate will prevent the reaction of calcium sulphate with the carbonate while eliminating the soluble carbonate as such from the solution.

20. The method of rendering plaster of Paris free from disintegration by water containing a carbonate which comprises adding barium chloride to the plaster of Paris.

21. The method of rendering a plaster of Paris mold resistant to disintegration by water containing a carbonate which comprises adding to the plaster of Paris prior to its contact with the water containing the carbonate a substance which in the presence of water and calcium sulphate and the carbonate will prevent the reaction of calcium sulphate and the carbonate.

22. The method of rendering a plaster of Paris mold resistant to disintegration by water containing a soluble carbonate which comprises adding to the plaster of Paris prior to its contact with the water containing the carbonate a substance which in the presence of water and calcium sulphate and the carbonate will prevent the reaction of calcium sulphate and the carbonate and will form a precipitate.

23. The method of rendering a plaster of Paris mold resistant to disintegration by water containing a carbonate which comprises adding to the plaster of Paris prior to its contact with the water containing the carbonate a substance more soluble than calcium sulphate which in the presence of water and calcium sulphate and the carbonate will prevent the reaction of calcium sulphate and the carbonate.

24. The method of rendering a plaster of Paris mold resistant to disintegration by a water solution containing a soluble carbonate which comprises adding to the plaster of Paris prior to its contact with the solution a substance which in the presence of said solution and calcium sulphate will prevent the reaction of calcium sulphate and the carbonate while eliminating the soluble carbonate as such from the solution.

25. In the method of casting pottery, the steps including preparing a slip containing a soluble carbonate, preparing a mold the material of which comprises plaster of Paris and a substance which will prevent a reaction between the carbonate in the slip and the calcium sulphate in the plaster of Paris, casting the slip in the mold, removing the cast, and firing it.

26. In the method of casting pottery, the steps including preparing a slip containing a carbonate, preparing a mold the material of which comprises plaster of Paris and a substance more soluble than calcium sulphate and which will prevent a reaction between the carbonate in the slip and the calcium sulphate in the plaster of Paris, casting the slip in the mold, removing the cast and firing it.

27. In the method of casting pottery, the steps including preparing a slip containing a soluble carbonate, preparing a mold the material of which comprises plaster of Paris and a substance which will prevent a reaction between the carbonate in the slip and the calcium sulphate in the plaster of Paris while forming a practically insoluble precipitate, casting the slip in the mold, removing the cast, and firing it.

28. In the method of casting pottery, the steps including preparing a slip containing a carbonate, preparing a mold the material of which comprises plaster of Paris and barium chloride, casting the slip in the mold, removing the cast and firing it.

29. In the method of casting pottery, the steps including preparing a slip containing a soluble carbonate, preparing a mold the material of which comprises plaster of Paris and a substance which in the presence of said slip will prevent a reaction between the carbonate in the slip and the calcium sulphate in the plaster of Paris, casting the slip in the mold, removing the cast and firing it.

30. In the method of casting pottery, the steps including preparing a slip containing a soluble carbonate, preparing a mold the material of which comprises plaster of Paris and a substance which in the presence of said slip will prevent a reaction between the carbonate in the slip and the calcium sulphate in the plaster of Paris while eliminating the soluble carbonate as such from the slip, casting the slip in the mold, removing the cast, and firing it.

In testimony that we claim the foregoing, we have hereunto set our hands this 24 day of Oct., 1924.

JOHN D. WIGGIN.
MATHIAS M. REMMES.